(12) United States Patent
Yang et al.

(10) Patent No.: US 6,954,509 B2
(45) Date of Patent: Oct. 11, 2005

(54) METHOD FOR CHANNEL EQUALIZATION

(75) Inventors: Bin Yang, München (DE); Peter Bohnhoff, München (DE)

(73) Assignee: Infineon Technologies AG, Munich (DE)

( * ) Notice: Subject to any disclaimer, the term of this patent is extended or adjusted under 35 U.S.C. 154(b) by 484 days.

(21) Appl. No.: 10/117,855

(22) Filed: Apr. 8, 2002

(65) Prior Publication Data

US 2003/0002574 A1 Jan. 2, 2003

Related U.S. Application Data

(63) Continuation of application No. PCT/DE00/03499, filed on Oct. 4, 2000.

(30) Foreign Application Priority Data

Oct. 6, 1999 (DE) .......................................... 199 48 373

(51) Int. Cl.[7] .......................... H04B 1/10; H06F 17/10; H03H 7/30
(52) U.S. Cl. ....................... 375/350; 708/300; 375/232
(58) Field of Search .................................. 375/232, 200, 375/350, 229, 142, 343; 342/159; 708/300

(56) References Cited

U.S. PATENT DOCUMENTS

| | | | | | |
|---|---|---|---|---|---|
| 5,294,933 | A | * | 3/1994 | Lee et al. | 342/159 |
| 5,930,289 | A | * | 7/1999 | Laakso et al. | 375/130 |
| 6,317,612 | B1 | * | 11/2001 | Farsakh | 455/67.11 |
| 6,636,561 | B1 | * | 10/2003 | Hudson | 375/232 |

FOREIGN PATENT DOCUMENTS

DE 197 43 171 A1 4/1999

OTHER PUBLICATIONS

Soft–decision feedback equalizer for continuous phase modulated signals in wideband mobile radio channels;Cheung, J.C.S.; Steele, R.;Communications, IEEE Transactions on, vol.: 42, Issue: 234, Feb./Mar./Apr. 1994 pp. :1628–1638.*

Givens rotation based least squares lattice and related algorithms; Ling, F.; Signal Processing, IEEE Transactions on [see also Acoustics, Speech, and Signal Processing, IEEE Transactions on], vol.: 39, Issue 7, Jul. 1991 pp. 1541–1551.*

Yang, B.: "An Improved Fast Algorithm for Computing the MMSE Decision–Feedback Equalizer", Int. J. Electron. Commun., XP–000994817, No. 6, 1999, pp. 339–345.

Cheung, J. C. S. et al.: "Soft–Decision Feedback Equalizer for Continuous Phase Modulated Signals in Widebend Mobile Radio Channels", IEEE, XP 000447396, No. 2/3/4, 1994, pp. 1628–1638.

Ling, F.: "Givens Rotation Based Least Squares Lattice and Related Algorithms", IEEE, XP 000240162, vol. 39, No. 7, Jul. 1991, pp. 1541–1551.

Proakis, J. G.: "Digital Communications", McGraw–Hill Inc., XP–002164181, 1995, pp. 621–622, pp. 652–654 and pp. 664–668.

Gu Y. et al.: "Adaptive Combined DFE/MLSE Techniques for ISI Channels", IEEE, XP 009594720, vol. 44, No. 7, Jul. 1, 1996, pp. 847–857.

* cited by examiner

*Primary Examiner*—Amanda T. Le
*Assistant Examiner*—Cicely Ware
(74) *Attorney, Agent, or Firm*—Laurence A. Greenberg; Werner H. Stemer; Ralph E. Locher

(57) ABSTRACT

A method for channel equalization of received data includes steps of: receiving the received data in a received data packet; calculating filter setting coefficients for an input filter and calculating equalizer setting coefficients for an equalizer; setting the input filter using the filter setting coefficients and setting the equalizer using the equalizer setting coefficients; equalizing the received data using the input filter and using the equalizer; determining channel parameters for the transmission channel from the received data $X_k$; storing the channel parameters in a data field; and performing the step of calculating the filter setting coefficients for the input filter and calculating the equalizer setting coefficients for the equalizer by performing a GIVENS rotation of the data field.

20 Claims, 4 Drawing Sheets

METHOD FOR CHANNEL EQUALIZATION

CROSS-REFERENCE TO RELATED APPLICATION

This application is a continuation of copending International Application No. PCT/DE00/03499, filed Oct. 4, 2000, which designated the United States.

BACKGROUND OF THE INVENTION

Field of the Invention

The invention relates to a method for channel equalization of received data that is being transmitted via a transmission channel, in which setting coefficients for filters and equalizers are determined with little computation effort and at a high computation rate.

One serious problem in communications systems is multipath signal propagation. FIG. 1 is provided to explain the problems of multipath propagation. There are generally a number of possible signal propagation paths between a base station or transmitter S and a mobile station acting as a receiver E. Reflection and scatter of signal waves on buildings, mountains, trees, and other obstructions mean that the received field strength is composed of a number of signal components which in general have different intensities and different delays.

The transmission channel between the transmitter S and the receiver E can be modeled, in order to take account of multipath propagation, as a transmission filter channel H with channel coefficients $h_k$, as is illustrated in FIG. 2. The transmitter S emits transmitted data or transmitted symbols $S_k$, via the transmission channel H, to a model adder that accounts for the superimposition of a noise signal on the transmitted signals $S_k$ that have been filtered by $h_k$. The transmitted data symbols $S_k$ may have a number of states, for example, eight states that are coded using 3 bits. The noise signal $h_k$ represents additive, white Gaussian noise with a variance $\sigma^2_n$, and is not correlated with the transmitted signal symbols $S_k$.

The transmitted signals $S_k$ that have been filtered by the transmission channel H and that have had noise superimposed on them, are received by the receiver as a received signal $X_k$, for which:

$$X_k = \sum_{i=0}^{L} h_i S_{k-i} + n_k \quad (1)$$

where L is the order of the modeled transmission channel filter H. As can be seen from equation 1, there is an intersymbol interference (ISI) problem with the received data, since $X_k$ is dependent not only on $S_k$, but also on $S_{k-1} \ldots, S_{k-L}$. Unless it is compensated for, the intersymbol interference (ISI) leads to high bit error rates. An equalizer is used within the receiver E in order to compensate for the intersymbol interference. This is normally a linear equalizer, decision feedback equalizer (DFE), or a so-called Viterbi equalizer.

FIG. 3 schematically shows a conventionally designed prior art receiver E. The received signal $X_k$ passes, via an internal line, to an input filter P with filter coefficients $P_k$. The input signal $Y_k$, which has been filtered by the input filter P, is supplied to an equalizer EQ, and is equalized. The equalized signal is emitted from the equalizer EQ, via an internal line, to a data processing circuit DP for internal data processing. The input filter P is an FIR filter, and can be described by the following equation:

$$Y_k = \sum_{i=0}^{N} p_i x_{k-i}$$

The filter coefficients $P_k$ are set by a controller C via a control line SL1. The equalizer EQ is likewise set by the internal controller C via a control line SL2. To this end, the controller C receives the received signal x(k) via an internal data line DL, and evaluates it in order to set the filter coefficients $P_k$ and the equalizer coefficients $g_k$.

The order of the input filter P is N, and is governed by the hardware configuration of the input filter P.

The equalizer EQ is, for example, a Viterbi equalizer, which uses the so-called Viterbi algorithm. In a Viterbi equalizer, the number of computational operations required increases exponentially with the number of transmission channel coefficients h. To be more precise, the number of computational operations required in the Viberti algorithm increases in proportion with the data transmission rate and with an exponential term $m^{L+1}$, where m represents the number of possible data signal states of the symbol S. Since the order of an actual transmission channel L is relatively high and the computation complexity of the Viterbi algorithm is thus very high, Viterbi equalizers are frequently used in such a way that the last channel coefficients are ignored or are cut off, in order to minimize the computation complexity. This reduces the quality of the equalization of the received signal, of course. As an alternative to Viterbi equalizers, prior art receivers E use MMSE-DFE equalizers (MMSE-DFE: minimum mean square error decision feedback equalizer), in particular for xDSL receivers.

FIG. 4 shows the internal design of such an MMSE-DFE equalizer in detail. The MMSE-DFE contains a subtractor that subtracts a feedback filter signal $g_k$, which has been filtered by a feedback filter G, from the received signal y(k), which has been filtered by the input filter P. The subtractor uses an internal line to feed the result of the subtraction to a decision-making device, for example a Schmitt trigger circuit. The feedback filter G is of the same order as the transmission channel, namely L.

The feedback filter G can be described by the following equation:

$$q_k = \sum_{i=1}^{L} g_i s_{k-N-i}. \quad (3)$$

The input signal $Z_k$ to the decision-making device is, accordingly, as follows:

$$Z_k = \sum_{i=0}^{N} p_i x_{k-i} - \sum_{i=1}^{L} g_i s_{k-N-i}.$$

The filter coefficients $P_k$, $g_k$ are set such that $Z_k$ corresponds to the transmitted signal sequence $S_{k-N}$, as much as possible. The discrepancy $e_k$ is defined as follows:

$$e_k = S_{k-N} - Z_k = \sum_{i=0}^{L} g_i s_{k-N-i} - \sum_{i=0}^{N} p_i x_{k-i} \quad (g_0 \equiv 1). \quad (5)$$

The power of the second moment of the discrepancy signal sequence is minimized in order to calculate the input filter coefficients $P_k$ and the feedback filter coefficients $g_k$ from the transmission signal channel impulse response coefficients $h_0, h_1 \ldots h_L$ and from the signal-to-noise ratio.

The computation complexity for MMSE-DFE is also considerable, so that it cannot be used for actual data transmission channels whose transmission channel order L is high.

The following documents generally describe the prior art relating to the present invention. The article "Givens Rotation Based Least Squares Lattice and Related Algorithms" by Fuyun Ling, which appeared in IEEE Transactions on Signal Processing, Volume 39, No. 7, 1991, pages 1541–1551, which represents the prior art that is closest to the present invention, describes calculations for coefficients of a least-squares equalizer by forming a triangular matrix. The calculations are carried out by applying a number of successive GIVENS matrix rotations to a data matrix that is filled with received data symbols. The coefficients of the equalizer can be read from the triangular matrix once the GIVENS rotations have been carried out.

The article "Soft-Decision Feedback Equalizer for Continuous Phase Modulated Signals in Wideband Mobile Radio Channels" by Joseph C. S. Cheung and Raymond Steele, which appeared in IEEE Transactions on Communications, Volume 42, No. 2/3/4, 1994, pages 1628–1638, proposes that a decision feedback equalizer (DFE) be combined with a Viterbi algorithm for equalization of CPM (Continuous Phase Modulation) signals.

The article "Adaptive Combined DFE/MLSE Techniques for ISI Channels" by Yonghai Gu and Tho Le-Ngoc, which appeared in IEEE Transactions on Communications, Volume 44, No. 7, 1996, pages 847–857, relates to a decision feedback equalizer which is integrated in a receiver that is designed to carry out a maximum likelihood estimation process on data sequences.

SUMMARY OF THE INVENTION

It is accordingly an object of the invention to provide a method for channel equalization which overcomes the above-mentioned disadvantages of the prior art methods of this general type.

In particular, it is an object of the invention to provide a method for channel equalization, in which the computational complexity for determining individual coefficients is reduced such that conventional filters and equalizers can be used for channel equalization of received data that is transmitted via a transmission channel having a high order.

With the foregoing and other objects in view there is provided, in accordance with the invention, a method for channel equalization of received data being transmitted via a transmission channel, which includes steps of: receiving the received data in a received data packet; calculating filter setting coefficients for an input filter and calculating equalizer setting coefficients for an equalizer; setting the input filter using the filter setting coefficients and setting the equalizer using the equalizer setting coefficients; equalizing the received data using the input filter and using the equalizer; determining channel parameters for the transmission channel from the received data $X_k$; storing the channel parameters in a data field; and performing the step of calculating the filter setting coefficients for the input filter and calculating the equalizer setting coefficients for the equalizer by performing a GIVENS rotation of the data field.

In accordance with an added feature of the invention, the complex channel coefficients h of the transmission channel impulse response and the signal-to-noise ratio SNR of the transmission channel H are approximately determined as channel parameters.

The channel parameters h are preferably temporarily stored in a two-dimensional data field which includes data rows and data columns, and which has a large number of data elements $d_{nm}$ where $0 \leq n \leq 1$ and $0 \leq -m \leq N+L+1$. The number S of data columns depends on the order N of the input filter and on the order L of the transmission channel, and the number Z of data rows is fixed.

The number S of data columns is preferably: $S=N+L+2$.

The number Z of data rows is preferably two.

In accordance with an additional feature of the invention, the products of the complex-conjugate channel coefficients h* and the square root of the signal-to-noise ratio SNR are temporarily stored as data elements $d_{0m}$ in the first row of the data field, and the complex transmission channel coefficients h are temporarily stored as data elements in the second row of the data field.

The GIVENS rotation of the data field when calculating the coefficients is preferably carried out in a number of GIVENS rotation steps, with the number of the GIVENS rotation steps depending on the order N of the input filter.

In accordance with another feature of the invention, each data element $d_{nm}$ in the second row within the data field is shifted by one data element position to the left between each GIVENS rotation step.

Those data elements, which are temporarily stored in the first row of the data field after the last GIVENS rotation step, are preferably read as calculated coefficients for setting the input filter and the equalizer.

In accordance with a further feature of the invention, after the last GIVENS rotation step, the data elements $d_{01}, d_{02} \ldots d_L$ in the first row and in the columns 1 to L of the data field are read as setting coefficients for the equalizer, and the data elements $d_{0, L+1}, d_{0, L+2} \ldots d_{0, L+N+1}$ in the first row and in the columns (L+1) to (L+N+1) are read as setting coefficients for the input filter.

FIR filters are preferably set by the calculated filter coefficients. The adjustable equalizer preferably has a decision-making device and a feedback filter that is set by the calculated equalizer setting coefficients.

In accordance with a further added feature of the invention, the equalizer is a Viterbi equalizer that is set by the calculated equalizer setting coefficients.

The received data packets are preferably transmitted using a time-division multiplexing mode.

The equalizer is preferably an EDGE equalizer, which is set by the calculated equalizer setting coefficients.

In the method, the received data is preferably transmitted via the transmission channel in accordance with a DSL data communications standard.

The input filter and the equalizer are preferably connected in series and form an MMSE-DFE equalizer.

In accordance with a further additional feature of the invention, the filter setting coefficients and the equalizer setting coefficients are calculated such that the bit error rate is minimized by the channel equalization.

The number of computational operations for calculating the setting coefficients when using the method is preferably proportional to the product of the order N of the input filter and the sum L+N of the order L of the transmission channel and the order N of the input filter.

Other features which are considered as characteristic for the invention are set forth in the appended claims.

Although the invention is illustrated and described herein as embodied in a method for channel equalization, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
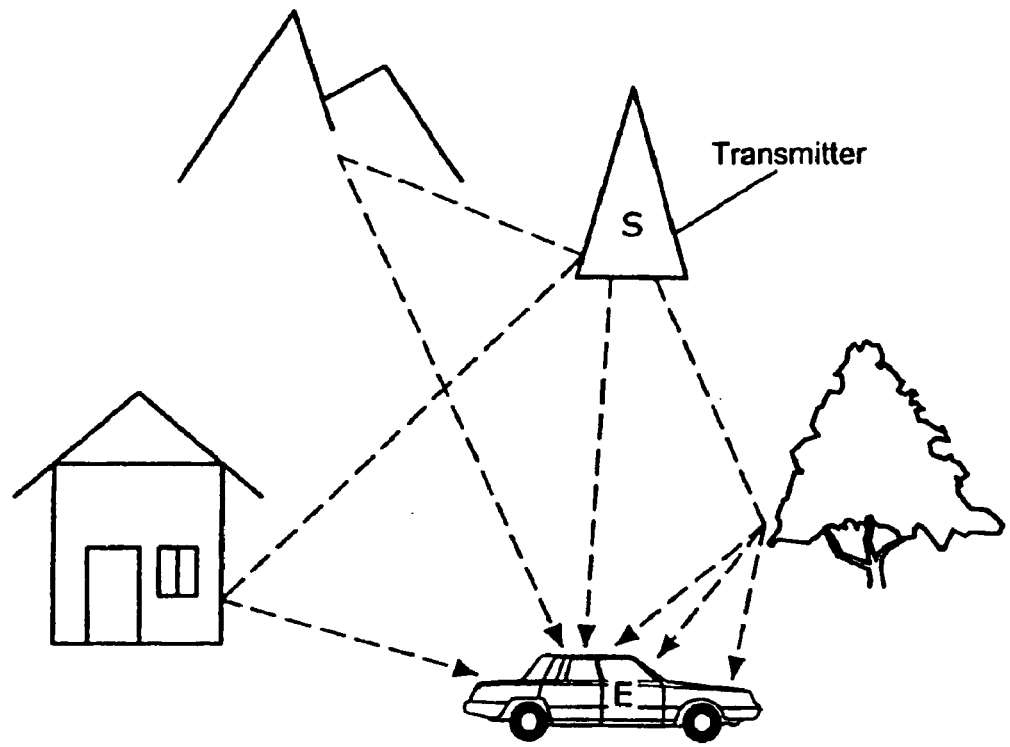
FIG. 1 is a schematic illustration for explaining the problems of multipath signal propagation.
Figure 2:
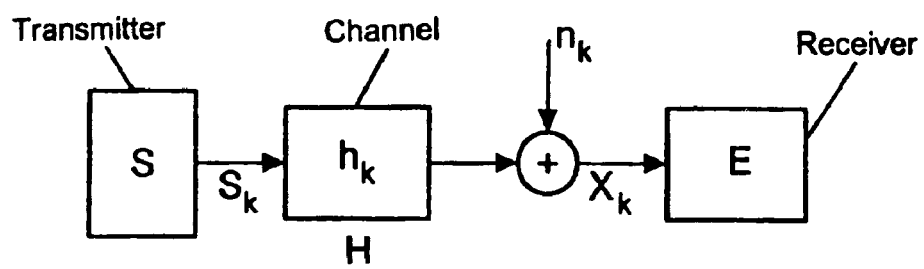
FIG. 2 shows a transmission channel model for modeling the transmission channel shown in FIG. 1.
Figure 3:
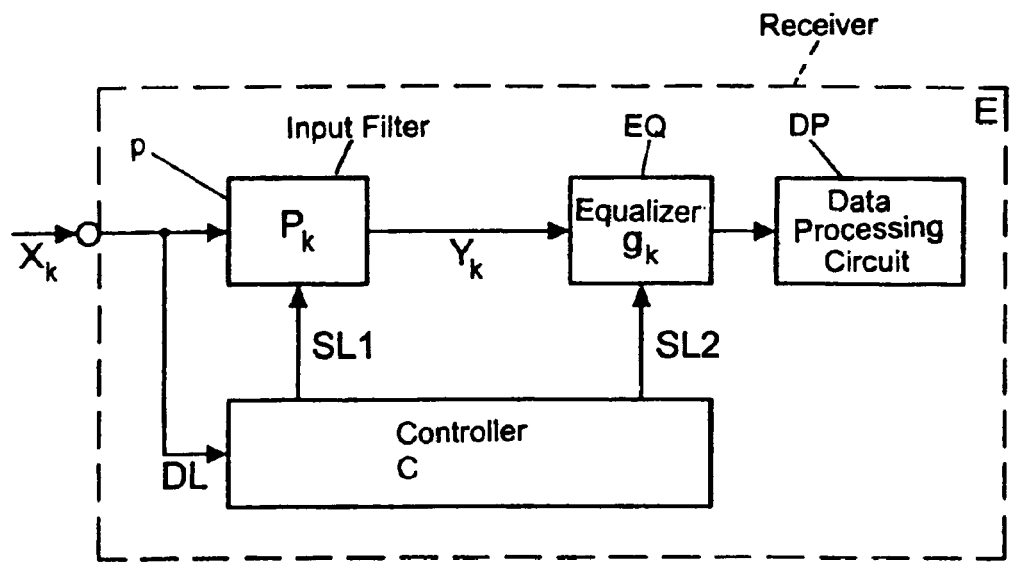
FIG. 3 shows a block diagram of a prior art receiver.
Figure 4:
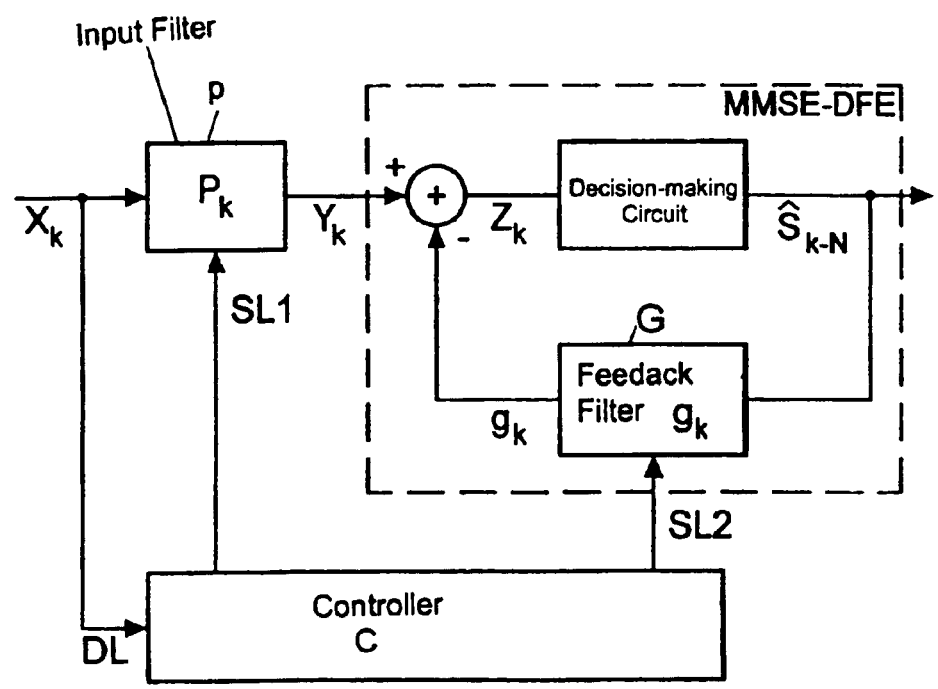
FIG. 4 shows a prior art receiver with a MMSE-DFE equalizer.
Figure 5:
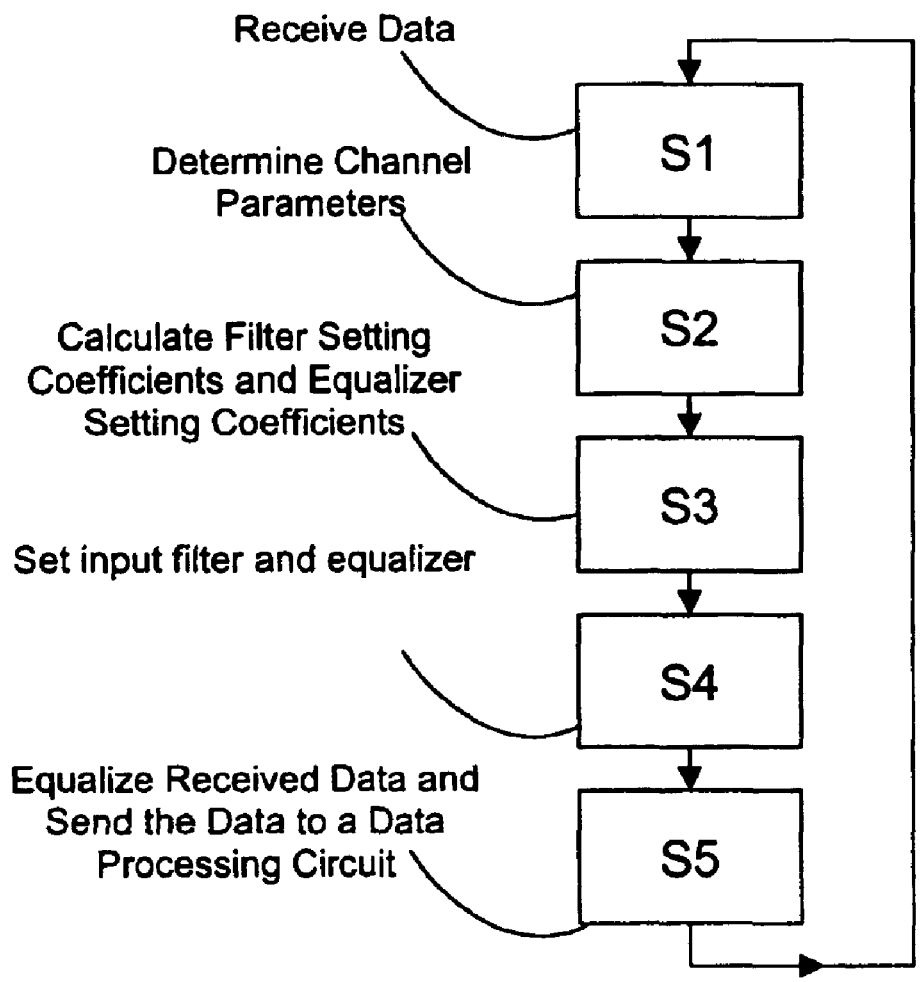
FIG. 5 is a flowchart showing the inventive method.

Referring now to FIG. 5 of the drawing in detail, there is shown an inventive method for channel equalization of received data. In step S1, the receiver E receives received data in a received data packet. The received data $X_k$ is transmitted in data packet blocks. The data packet blocks are transmitted in time slots using a time-division multiplexing transmission system as is used, for example, in the mobile radio field.

In step S2, channel parameters for the transmission channel of the channel H are determined or estimated from the received data $X_k$ and are stored in a data field in a buffer storage device. The temporarily stored channel parameters are preferably the complex channel coefficients h of the transmission channel impulse response, and the signal-to-noise ratio SNR of the transmission channel H.

The signal-to-noise ratio SNR is defined by the ratio of the variance $\sigma_s^2$ of the statistically independent transmitted symbols $S_k$ and the variance $\sigma_n^2$ of the noise signal $n_k$:

$$SNR = \frac{\sigma_s^2}{\sigma_n^2} \qquad (6)$$

The two-dimensional data field is a data matrix having a number of data rows and data columns. The number S of data columns in this case depends on the order N of the input filter P and the order L of the transmission channel H, where:

$$S=N+L+2. \qquad (7)$$

The number Z of data rows in the data field is:

$$Z=2. \qquad (8)$$

The value of the data elements $d_{nm}$, where $0\leq n\leq 1$ and $0\leq m\leq N+L+1$, when the channel parameters are temporarily stored follows a predetermined system in the inventive method. By way of example, the following text describes a data field D after the temporary storage of the channel parameters for a transmission channel of order L=2 and with an input filter of order L=4.

$$D_0 = \begin{bmatrix} \frac{1}{\sqrt{SNR}} & 0 & 0 & 0 & 0 & h_2^* \cdot \sqrt{SNR} & h_1^* \cdot \sqrt{SNR} & h_0^* \cdot \sqrt{SNR} \\ & & & & \cdots & & & \\ h_0 & h_1 & h_2 & 0 & 0 & 0 & 0 & 0 \end{bmatrix} \qquad (9)$$

$$\underset{L+1}{\longleftarrow\!\longrightarrow} \quad \underset{N+1}{\longleftarrow\!-\!-\!-\!-\!-\!-\!-\!-\!\longrightarrow}$$

After temporarily storing the channel parameters in the data field $D_0$, the filter setting coefficients $P_k$ of the input filter P and the equalizer setting coefficients $g_k$ of the equalizer are calculated in step S3 of the method by performing a GIVENS rotation of the data field D. The GIVENS rotation of the data field D is described in detail in the following text in conjunction with FIG. 6.

Once the setting coefficients have been calculated, the input filter P and the equalizer are set, in step S4, using the calculated coefficients.

In step S5, the received data $X_k$ in a received data packet is equalized by the input filter P, which has been set, and the equalizer, which has been set, and is emitted to a downstream data processing circuit DV for further data processing. After this, the method according to the invention for channel equalization returns to step S1 in order to receive the received data from the next received data packet.

Figure 6:
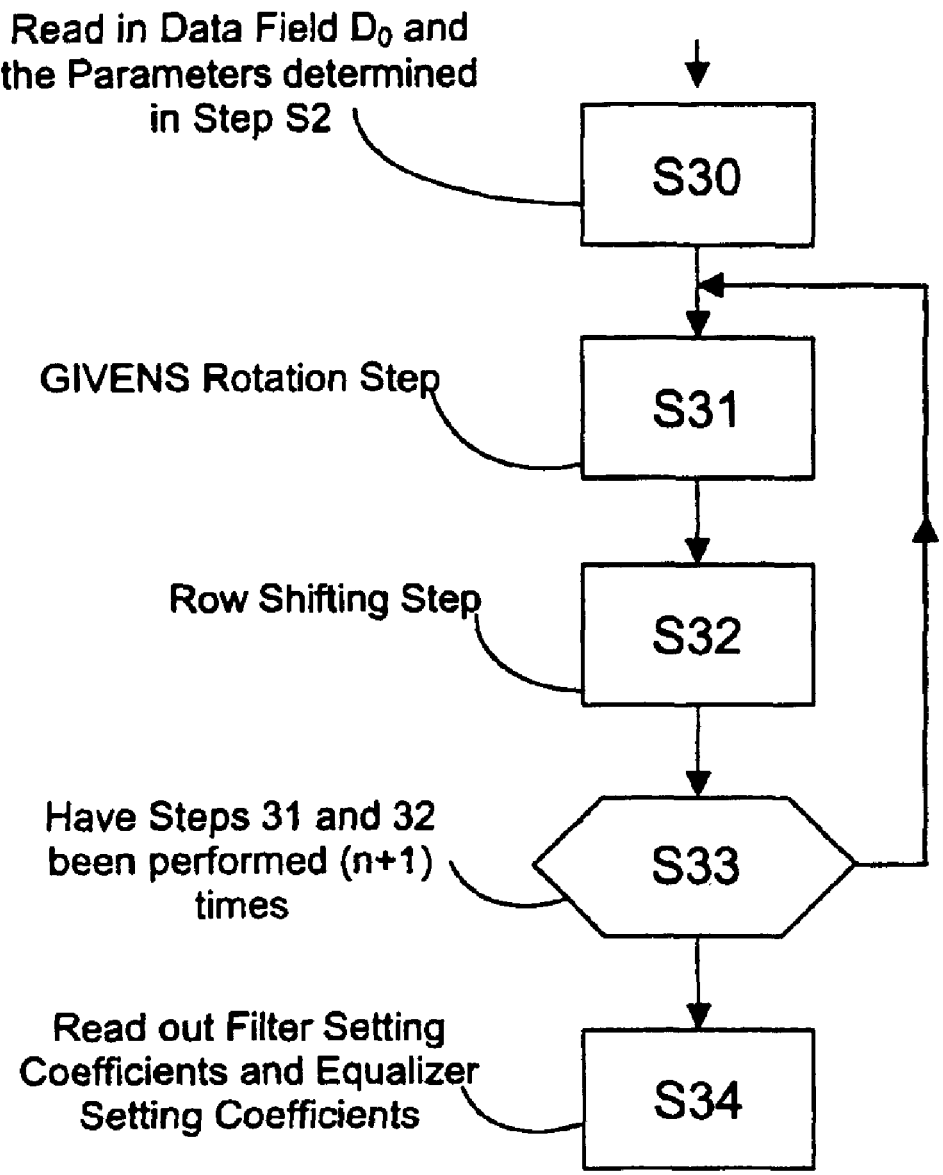
FIG. 6 is a flowchart for calculating the adjustable coefficients using the inventive method.

The calculation of the setting coefficients for the input filter and the equalizer will be described in detail in the following text with reference to FIG. 6. In this case, FIG. 6 shows the detailed steps from the calculation step S3 in FIG. 5.

In step S30, the temporarily stored data field $D_0$ is read in, together with the channel parameters which were determined in step S2 and were temporarily stored in that field, in order to carry out a GIVENS rotation, as described above. The data field $D_0$ has two rows and L+N+2 columns, where L is the order of the transmission channel, and M is the order of the input filter. The inverse value of the square root of the signal-to-noise ratio SNR of the transmission channel is located in the first row of the data field $D_0$ and in the first column of the data field $D_0$ (at location $d_{00}$). The product of the conjugate value h* of the complex channel coefficients h and the square root of the signal-to-noise ratio SNR is in each case stored in the last (L+1)-th columns within the first row of the data field $D_0$. The other data elements d in the data field $D_0$ within the first row are set to zero.

Within the second row of the data field $D_0$, the data elements d in the first (L+1)-th columns are filled with the complex channel coefficients $h_0, h_1 \ldots$ of the data transmission channel H. The other (N+1)-th data elements d in the data field $D_0$ are set to zero.

The GIVENS rotation comprises a number of GIVENS rotation steps, in which the data field $D_0$ is varied step-by-step in accordance with a predetermined mathematical rule. The process of carrying out the GIVENS rotation is described in detail in G. Golub "Matrix computations", 1983, John Hopkins press. The mathematical rule for carrying out a GIVENS rotation step is defined in the following text:

$$D_0 = \begin{bmatrix} r_0 r_1 r_2 \ldots \\ x_0 x_1 x_2 \ldots \end{bmatrix} \xrightarrow{F} D_1 = \begin{bmatrix} \bar{r}_0 \bar{r}_1 \bar{r}_2 \ldots \\ 0 \bar{x}_1 \bar{x}_2 \ldots \end{bmatrix} \quad (10)$$

The data field $D_0$ is changed by the GIVENS rotation step G to a data field $D_1$.

In this case, the rule for the first column of the data field is
Column 0:

$$\bar{r}_0 = \sqrt{r_0^2 + |x_0|^2} \quad (11)$$

$$c = r_0/\bar{r}_0 \quad (12)$$

$$s = x_0/\bar{x}_0 \quad (13)$$

The other columns of the data field are changed in accordance with the following mathematical rules:
Columns i=1, 2 . . . :

$$\bar{r}_c = c \cdot r_i + s^* \cdot x_i \quad (14)$$

$$\bar{x}_i = -s \cdot r_i + c \cdot x_i, \quad (15)$$

where s* is the complex-conjugate coefficient of S.

Such a GIVENS rotation step is carried out in step S31, as shown in FIG. 6. After carrying out the GIVENS rotation step S31, each data element d within the second row of the data field D is shifted by one position to the left in the step S32, and the data elements that become free are set to zero. A check is carried out in step S33 to determine whether the GIVENS rotation step S31 and the row shifting step S32 have been carried out (N+1) times, where N is the order of the input filter. If the internal loop counter is less than N+1, the process returns to step S31, otherwise, in step S34, specific data elements are read from the rotated data field in order to set the coefficients. Once (N+1) rotation and shifting steps have been carried out, the rotated data field is in the following form:

$$D_{N+1} = \begin{bmatrix} g_0 & g_1 & \ldots & g_2 & p_0 & p_1 & p_2 & p_3 & p_4 \\ & & & \ldots & & & & & \\ 0 & \bar{x} & \ldots & \bar{x} & \bar{x} & \bar{x} & \bar{x} & \bar{x} & \bar{x} \end{bmatrix} \quad (16)$$

The data elements $d_1, d_2 \ldots d_{0L}$ in the first row of columns 1 to L of the data field $D_{N+1}$ are read in step S34 as setting coefficients $g_1, g_2 \ldots g_L$ for the equalizer once the final GIVENS rotation step has been carried out. The data elements $d_{o, L+1}; d_{o, L+2} \ldots d_{o, L+N+1}$ in the first row and in the columns (L+1) to column (L+N+1) of the data field $D_{N+1}$ are read as setting coefficients $p_0, p_1 \ldots p_N$ for the input filter P in step S34. The equalizer setting coefficients $g_{1, g2} \ldots g_L$ which have been read can be used to set a Viterbi equalizer, an EDGE equalizer or the feedback filter in an MMSE-DFE equalizer.

The filter setting coefficients $p_0, p_1 \ldots P_N$ are read in order to set the coefficients for the FIR input filter. The calculated filter setting coeffients $p_0, P_1 \ldots P_N$ and the equalizer setting coefficients $g_1, g_2 \ldots g_L$ are calculated in calculation step S3 of the method such that the BIT error rate of the received signal is minimized by the channel equalization. The number of computational operations for calculating the setting coefficients g, p is in this case very small.

The number of computational operations is proportional to the product of the order N of the input filter P and the sum (L+N) of the order of the transmission channel H, and the order N of the input filter P.

The number of computational operations in conventional receivers which, for example, contain a Viterbi equalizer or an MMSE-DFE equalizer rises exponentially:

$$\text{Computation complexity} \sim (N+L)^3 \quad (17)$$

In contrast, the number of computational operations with the inventive method rises proportionately, in accordance with the following equation:

$$\text{Number of computational operations} \sim N(N+L) \quad (18)$$

A typical value for the order L of the transmission channel for mobile radio transmissions is L=5, with input filters of order N=20 being used, for example. The reduction in the computation complexity is expressed as the ratio of the number of computational operations required, and is accordingly:

$$\text{Computation complexity reduction} = -\frac{(N+L)^3}{N(N+L)} \quad (19)$$

If L=5 and N=20, the inventive method decreases the computational complexity by a factor of 31 in comparison to conventional receivers.

By reducing the number of necessary computational operations and as a result of the increase in the computation speed that results from this, it is thus possible to use MMSE-DFE equalizers or Viterbi equalizers even for realistic applications such as mobile radio telephones, which operate using the full-duplex mode, and for actual transmission channels with relatively high transmission channel orders L. This makes it possible to considerably reduce the BIT error rate during the data transmission.

One computation speed can be further increased or the number of computational operations can be reduced if, instead of the conventional GIVENS rotation (see equations 11–15), a so-called root-free GIVENS rotation is used, in which the root operation in equation (11) is avoided.

The inventive method can be used for equalizing any desired received data within received data packets in a time-division multiplexing transmission system. The data can in this case be transmitted by means of DSL data communications standards, for example.

We claim:

1. A method for channel equalization of received data being transmitted via a transmission channel, which comprises:

receiving the received data in a received data packet;

calculating filter setting coefficients for an input filter and calculating equalizer setting coefficients for an equalizer;

setting the input filter using the filter setting coefficients and setting the equalizer using the equalizer setting coefficients;

equalizing the received data using the input filter and using the equalizer;

determining channel parameters for the transmission channel from the received data $X_K$;

storing the channel parameters in a data field; and performing the step of calculating the filter setting coefficients for the input filter and calculating the equalizer setting coefficients for the equalizer by performing a GIVENS rotation of the data field.

2. The method according to claim 1, wherein: the step of determining the channel parameters includes approximating complex channel coefficients of a transmission channel impulse response and a signal-to-noise ratio of the transmission channel.

3. The method according to claim 2, wherein the step of storing channel parameters includes:

obtaining complex-conjugates of the complex channel coefficients;

temporarily storing products of the complex-conjugates of the complex channel coefficients and a square root of the signal-to-noise ratio as data elements in a first row of the data field; and temporarily storing the complex channel coefficients h as data elements in a second row of the data field.

4. The method according to claim 2, wherein:

the input filter is characterized by an order N;

the transmission channel is characterized by an order L;

the data field is a two-dimensional data field having data rows, data columns, and data elements $d_{nm}$, where $0 \leq n \leq 1$ and $0-\leq m \leq N+L+1$;

the data field has a number of data columns that depends on the order N of the input filter and the order L of the transmission channel; and the data field has a fixed number Z of data rows.

5. The method according to claim 1, wherein:

the input filter is characterized by an order N;

the transmission channel is characterized by an order L;

the data field is a two-dimensional data field having data rows, data columns, and data elements $d_{nm}$, where $0 \leq n \leq 1$ and $0-\leq m \leq N+L+1$;

the data field has a number of data columns that depends on the order N of the input filter and the order L of the transmission channel H; and the data field has a fixed number Z of the data rows.

6. The method according to claim 5, wherein:

the step of determining the channel parameters includes approximating complex channel coefficients of a transmission channel impulse response; and the step of storing channel parameters includes:

temporarily storing products of complex-conjugates of the channel coefficients and a square root of the signal-to-noise ratio as data elements in a first row of the data field, and temporarily storing the complex channel coefficients as data elements in a second row of the data field.

7. The method according to claim 1, wherein the GIVENS rotation of the data field is performed by carrying out a number of GIVENS rotation steps in which the number of the GIVENS rotation steps depends on an order N of the input filter P.

8. The method according to claim 1, which comprises:

performing the GIVENS rotation of the data field by carrying out a number of GIVENS rotation steps in which the number of the GIVENS rotation steps depends on an order N of the input filter;

between each of the GIVENS rotation steps, shifting each data element in a second row of the data field by one position to the left;

configuring the data field as a two-dimensional data field having data rows, data columns, and data elements $d_{nm}$, where $0 \leq n \leq 1$ and $0-\leq m \leq N+L+1$;

providing the data field with a number S of data columns depending on an order N of the input filter and an order L of the transmission channel; and providing the data field with a fixed number Z of the data rows.

9. The method according to claim 1, which comprises:

performing the GIVENS rotation of the data field by carrying out a number of GIVENS rotation steps in which the number of the GIVENS rotation steps depends on an order N of the input filter; configuring the data field as a two-dimensional data field having data rows, data columns, and data elements $d_{nm}$, where $0 \leq n \leq 1$ and $0-\leq m \leq N+L+1$;

providing the data field with a number S of data columns depending on an order N of the input filter and an order L of the transmission channel;

providing the data field with a fixed number Z of the data rows; and after a last one of the Givens rotation steps, reading data elements being temporarily stored in a first row of the data field and using the data elements in the first row as the filter setting coefficients and as the equalizer setting coefficients.

10. The method according to claim 1, which comprises:

performing the GIVENS rotation of the data field by carrying out a number of GIVENS rotation steps in which the number of the GIVENS rotation steps depends on an order N of the input filter;

between each of the GIVENS rotation steps, shifting each data element in a second row of the data field by one position to the left;

configuring the data field as a two-dimensional data field having data rows, data columns, and data elements $d_{nm}$, where $0 \leq n \leq 1$ and $0-\leq m \leq N+L+1$;

providing the data field with a number S of data columns depending on an order N of the input filter and an order L of the transmission channel H;

providing the data field with a fixed number Z of the data rows; and after a last one of the Givens rotation steps, reading data elements being temporarily stored in a first row of the data field and using the data elements in the first row as the filter setting coefficients and as the equalizer setting coefficients.

11. The method according to claim 1, which comprises:

performing the GIVENS rotation of the data field by carrying out a number of GIVENS rotation steps in which the number of the GIVENS rotation steps depends on an order N of the input filter;

configuring the data field as a two-dimensional data field having data rows, data columns, and data elements $d_{nm}$ where $0 \leq n \leq 1$ and $0-\leq m \leq N+L+1$;

providing the data field with a number S of data columns depending on an order N of the input filter and an order L of the transmission channel;

providing the data field with a fixed number Z of the data rows;

after a last one of the GIVENS rotation steps, reading data elements $d_{01}, d_{02} \ldots d_L$ being in a first row and in columns 1 to L of the data field for use as the equalizer setting coefficients; and after the last one of the GIVENS rotation steps, reading data elements $d_{0,(L+1)}, d_{0,(L+2)}, d_{0,(L+N+1)}$ being in the first row and in column (L+1) to column (L+N+1) for use as the input filter setting coefficients.

12. The method according to claim 1, which comprises: using an FIR filter as the input filter.

13. The method according to claim 1, which comprises: providing the equalizer with a decision-making device and a feedback filter being set by the equalizer setting coefficients.

14. The method according to claim 1, which comprises: providing the equalizer as a Viterbi equalizer being set by the equalizer setting coefficients.

15. The method according to claim 1, wherein: the received data packet has been transmitted using a time-division multiplexing mode.

16. The method according to claim 1, which comprises: providing the equalizer as an EDGE equalizer being set by the equalizer setting coefficients.

17. The method according to claim 1, wherein: the received data has been transmitted via the transmission channel in accordance with a DSL data communications standard.

18. The method according to claim 1, which comprises: connecting the input filter and the equalizer in series to form an MMSE-DFE equalizer.

19. The method according to claim 1, which comprises: performing the step of calculating the filter setting coefficients and calculating the equalizer setting coefficients such that when performing the step of equalizing the received data, a BIT error rate is minimized.

20. The method according to claim 1, wherein:

the input filter is characterized by an order N;

the transmission channel is characterized by an order L; and a number of computational operations required for calculating the setting coefficients is proportional to a product of the order N of the input filter and a sum of the order L of the transmission channel and the order N of the input filter.

\* \* \* \* \*